Dec. 20, 1966    S. J. KENNEDY ETAL    3,292,181
ARMORED BODY SHIELD

Filed March 4, 1964    2 Sheets-Sheet 1

INVENTORS
STEPHEN J. KENNEDY
EDWARD R. BARRON
MILDRED K. HOLLY &
DALE W. BUFFINGTON
BY Harry M. Saragovitz,
Edward J. Kelly, Herbert Berl &
Lawrence E. Labadini ATTORNEYS Dec. 20, 1966  S. J. KENNEDY ETAL  3,292,181
ARMORED BODY SHIELD Filed March 4, 1964  2 Sheets-Sheet 2

INVENTORS
STEPHEN J. KENNEDY
EDWARD R BARRON
MILDRED K. HOLLY
DALE W BUFFINGTON
BY Harry M. Saragovitz,
Edward J. Kelly, Herbert Berl &
Lawrence E. Labadini ATTORNEYS

United States Patent Office 3,292,181
Patented Dec. 20, 1966

3,292,181
ARMORED BODY SHIELD
Stephen J. Kennedy, Needham Heights, Edward R. Barron, Framingham, and Mildred K. Holly, Maynard, Mass., and Dale W. Buffington, San Francisco, Calif., assignors to the United States of America as represented by the Secretary of the Army
Filed Mar. 4, 1964, Ser. No. 349,506
7 Claims. (Cl. 2—2.5)

The invention described herein, it patented, may be manufactured and used by or for the Government for governmental purposes without the payment to us any royalty thereon.

Personnel engaged in flying rotary or fixed wing aircraft that customarily operate at relatively slow speeds and at low altitudes in areas of military conflict are especially vulnerable to small arms fire from the ground. Weight limitations and visibility requirements for low altitude operations preclude the equipping of such aircraft with conventional armor plate having capability of resisting penetration by high velocity projectiles Armored garments of the type developed for use by ground troops, at best, only afford limited protection against low velocity fragments or projectiles and are ineffective against high velocity projectiles. Accordingly, crew personnel of aircraft that operate both at relatively low speeds and low altitudes for tactical, reconnaissance, troop transport, or other missions, have had no defensive protection against small arms fire.

Complete protection of an aircraft pilot against small arms fire by providing an armor covering on the aircraft would, as already indicated, be impractical because of the weight involved and because of the reduced visibility that would result. An armored suit would be equally impractical as it would be too heavy, restrict the movements of the pilot, and would prove to be a hazard to the pilot in the crash of an aircraft.

The armored shield of this invention, on the other hand, furnishes protection to substantially all of the vital areas of the torso and in the case of upwardly angled shots to the neck and head areas. The shield is designed and constructed so as not to restrict the movements or obstruct the vision of the wearer, to permit easy and trouble-free donning and doffing and to provide that the weight of the shield will not be borne by the wearer. The ballistic protection of this shield is achieved with a minimum of armor material due to its unique construction and configuration and does not materially add to the weight of the aircraft.

While the shield of this invention is most appropriate for pilots of helicopters and other relatively slow, low altitude aircraft, it is also suitable for use by operators and others seated in land and water vehicles exposed to small arms fire.

The accompanying drawings illustrate a preferred embodiment of our invention, but should not be deemed to limit the scope of our invention to any of the details shown therein.

FIGURE 1 of the drawing is a front elevation of an armored shield in accordance with our invention;

Figure 1:
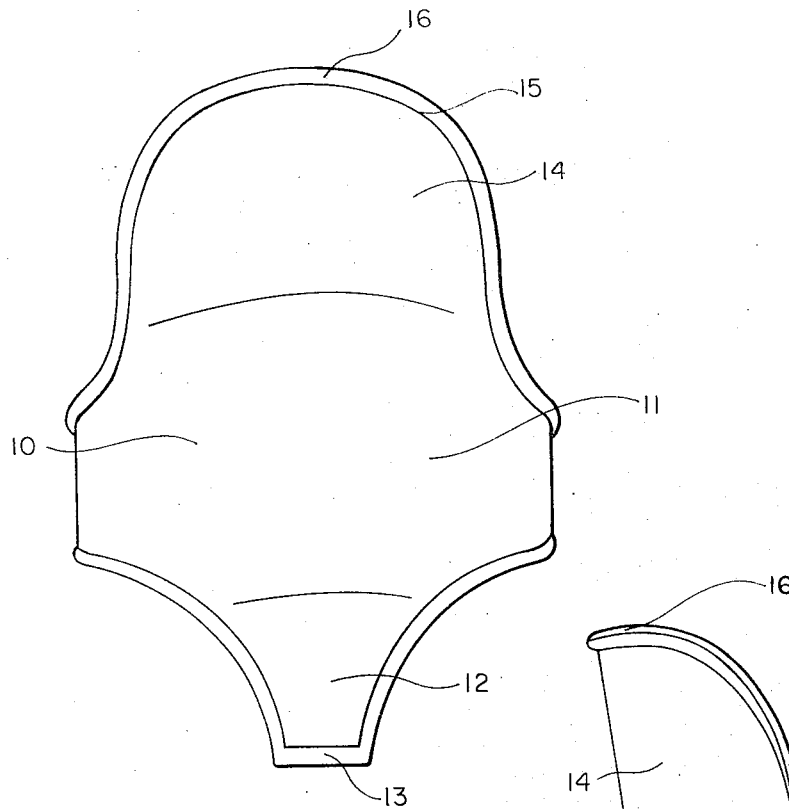
Figure 2:
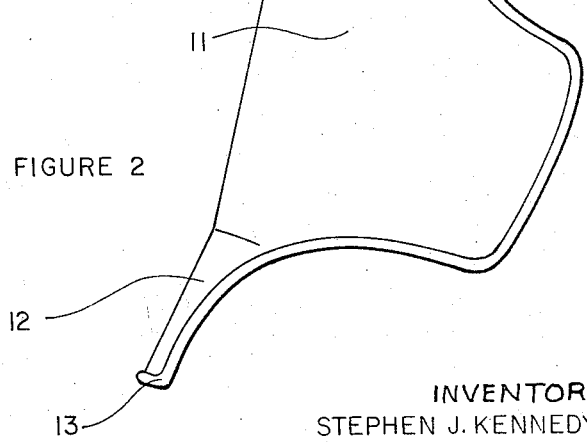
FIGURE 2 is a side elevational view of the embodiment of FIGURE 1.

More particularly, the body shield in accordance with the present invention is constructed of ballistic armor material so as to substantially cover all of the front and side aspects of the torso of the wearer. The preferred embodiment of the armored shield 10, as shown in FIGURES 1 and 2, is a one-piece structure for purposes of description can be considered to be divided into upper, mid and lower sections.

The mid-section 11 is a panel that is curved along its transverse axis to fit closely around the torso of the wearer and completely covers both sides and the abdomen of the wearer from approximately the top of the abdomen and just below the shoulders to a line extending just above the pelvic girdle.

The lower section 12 of the shield is a panel curved aolng its transverse axis, and extending downwardly from and with a slight forward inclination with respect to the longitudinal axis of the mid-section 11 to cover the lower abdomen of the wearer. The sides of this section curve inwardly toward each other so as to fit over and around the thighs of the wearer. The lowermost portion of section 12 projects downwardly between the thighs of the wearer sufficiently so that the base 13 thereof bears against and rests on seat 21. In extending the shield downwardly to cause the base 13 thereof to bear against the seat, the heavy weight of the armored shield is supported by the seat and not by the wearer. It is to be appreciated that the weight of the sheld armored to withstand small arms fire is of such magnitude that it could not be borne by the wearer for any length of time without drastically impairing the efficiency of the wearer and, in fact, might prove to be a physical hazard by interrupting the normal circulation within the lower limbs.

The upper section 14 of the shield is a panel that is curved along its transverse axis to accommodate the curvature of the body, extends upwardly from the mid-section 11 and covers substantially all of the chest area between the shoulders of the wears. The upper edge 15 as shown in the drawings, extends as high as the base of the neck and while this has proved to be a generally acceptable height, the height of the shield may be raised above this point if desired. In those cases where the shield is to be worn by aircraft pilots where an unobstructed downward view is essential, it is preferred that the shield extends no higher than the base of the neck. As is shown most clearly in FIGURE 2, upper section 14 extends upwardly and with a forward inclination with respect to the longitudinal axis of mid-section 11. This outward or forward inclination serves not only to keep the upper portion of the shield away from the body permitting unrestricted head and neck movement but also serves to protect a substantially greater portion of the neck and head area from projectiles approaching the wearer at angles below the horizontal. In practice the upper section may be inclined at an angle anywhere from about 5° to about 45° and preferably from about 15° to about 35° with respect to the longitudinal axis of the mid-section.

An additional and highly important feature of this shield is the presence of flange 16 about the top rim or edge 15 which flange inclines outwardly at an angle of from about 15° to about 60° from the longitudinal axis of the upper section 14 and preferably about 45°. The flange 16 which serves to further protect the neck and head areas from upwardly angled shots, richocheting projectiles and spattering fragments of the shield is at least one inch in width and preferably 2 inches or more and is formed of armor material.

Figure 3:
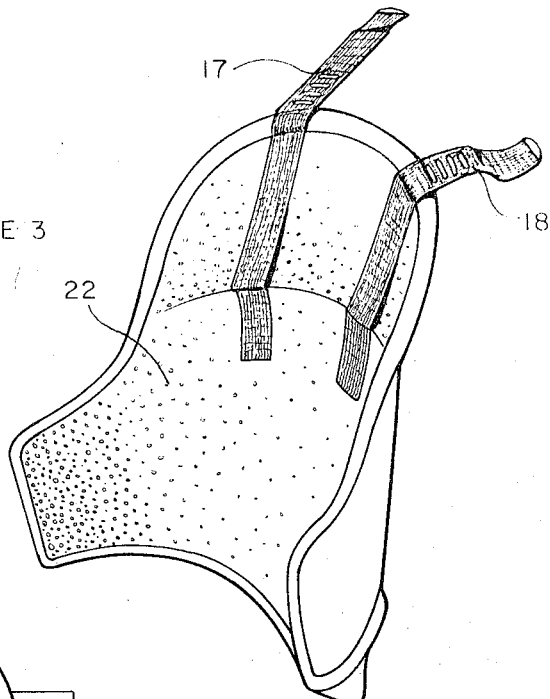
FIGURE 3 is a rear view in perspective of the armored shield of FIGURE 1.
Figure 4:
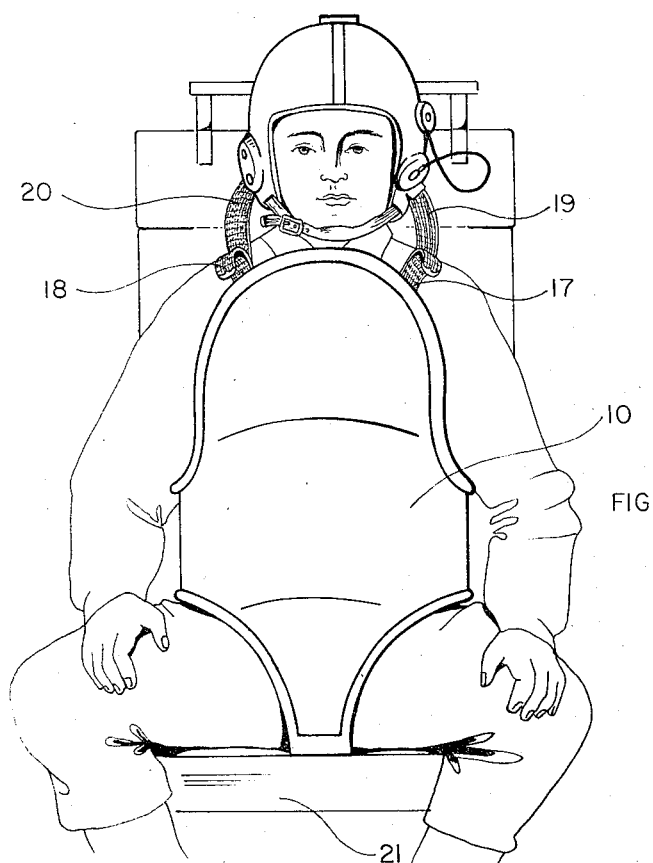
FIGURE 4 is a front elevational view of the shield of FIGURE 1 as it appears when being worn.

The body shield is held in place by means of straps and preferably as shown in FIGURE 3 by a pair of straps 17 and 18 which are attached to the rear of the shield and are designed to pass over the shoulders of the wearer and to be adjustably attached respectively to a pair of straps 19 and 20, shown in FIGURE 4, secured to the frame of the seat 21. Means to secure the shield may be fastened to or around the wearer or to other structures in the vehicle instead of to the seat frame if desired since such means do not serve to carry the weight of the shield but merely to hold the shield in place. The securing means need not pass over the shoulders of the wearer but may if desired pass under the arms of the wearer or in any other manner deemed suitable.

The armor material which comprises the bulk of the shield can be any of those materials known in the art as having desirable ballistic properties. An example of a suitable material is a high strength manganese steel alloy known in the trade as "Hadfield Steel" in an appropriate thickness known to those skilled in the art as capable of resisting small arms, e.g., 30 caliber, fire. Other materials include titanium alloys, e.g., a ternary alloy containing 5% aluminum and 2.5% tin, and non-metallic armors such as resin-impregnated glass fabric laminates disclosed in U.S. Patent No. 2,562,951 in appropriate thickness.

The exterior face of the shield may be covered with a ballistic nylon fabric, i.e., a tightly woven high tenacity nylon fabric, which will tend to reduce spall of the projectile or armor material on impact.

A lining of energy absorbing material is laminated to the back of the shield. The purpose of this lining is to prevent bruising of the wearer which would otherwise result from the impact of the shield against the wearer when the shield is struck by a bullet or other projectile. An approximately one-half inch thick layer of nylon felt is sufficient for this purpose. Other materials which may be used include foamed materials such as polyurethane or rubber foams in an appropriate thickness.

The armored body shield of this invention provides total protection against small arms fire. This shield is especially designed to be worn and to protect persons who are seated in a vehicle. The protection afforded by the shield is to the front and sides of the torso of the wearer. Protection to the rear aspect of the torso if desired will have to be furnished by the seat which is preferably armored. The combination of an armored seat and the body shield of this invention will completely protect the vital areas of the torso from small arms fire and will even protect substantially all of the head and neck from upwardly angled shots.

While changes in the construction, arrangement, proportions, dimensions and shape of the armored body shield disclosed in this specification will readily occur to the expert without departing from the spirit of our invention, it is our desire to encompass such variations within the scope of such invention.

We claim:

1. An armored shield to protect the torso of a seated wearer from small arms fire and other high velocity projectiles, said shield comprising
   (1) a midsection adapted to cover the abdomen and sides of a wearer thereof,
   (2) a lower section comprising a downward extension of said midsection, said lower section having sides inwardly tapered and thereby being adapted to extend downwardly between the thighs of a seated wearer and to have its base rest on the surface on which said wearer is seated,
   (3) an upper section comprising an upward extension of said midsection and inclined outwardly therefrom, said upper section being adapted to substantially cover the chest of a wearer and to permit unrestricted movements of the head and neck of a wearer and,
   (4) fastening means attached to said shield and adapted to hold said shield in place in front of said wearer.

2. An armored shield to protect the torso of a seated wearer from small arms fire and other high velocity projectiles, said shield comprising
   (1) a midsection curved along its transverse axis and adapted to cover the abdomen and sides of a wearer thereof,
   (2) a lower section comprising a downward extension of said midsection, said lower section having its sides tapered toward the base thereof whereby said lower section is adapted to extend downwardly between the thighs of a seated wearer and to have the base of said shield rest on the surface on which said wearer is seated,
   (3) an upper section comprising an upward extension of said midsection and inclined outwardly therefrom, said upper section being adapted to substantially cover the chest of a wearer and to permit unrestricted movements of the head and neck of a wearer,
   (4) a flange contiguous with and extending outwardly from the upper edge of said upper section and adapted to deflect ricochetting and spattering fragments away from the head and neck of a wearer and,
   (5) fastening means attached to said shield adapted to secure said shield in place in front of said wearer.

3. An armored shield to protect the torso of a seated wearer from small arms fire and oher high velocity projectiles, said shield comprising
   (1) a midsection curved along its transverse axis and adapted to cover and surround the abdomen and sides of a wearer thereof,
   (2) a lower section comprising a downward extension of said midsection, said lower section having sides curved inwardly toward the base thereof whereby said lower section is adapted to fit around and to extend downwardly between the thighs of a seated wearer and to have the base of said shield rest on the surface on which said wearer is seated,
   (3) an upper section comprising an upward extension of said midsection being curved along its transverse axis, said upper section having a forward inclination with respect to the longitudinal axis of said midsection and being adapted to substantially cover the chest of a wearer while permitting unrestricted movements of the head and neck of a wearer,
   (4) a flange contiguous with and extending outwardly from the upper edge of said upper section and adapted to deflect ricochetting and spattering fragments away from the head and neck of a wearer, and
   (5) a fastening means attached to said shield adapted to secure said shield in place in front of said wearer.

4. An armored shield to protect the torso of a seated wearer from small arms fire and other high velocity projectiles, said shield comprising
   (1) a midsection curved along its transverse axis and adapted to cover and surround the abdomen and sides of a wearer thereof,
   (2) a lower section comprising a downward extension of said midsection, said lower section having a forward inclination with respect to the longitudinal axis of said midsection and having sides curved inwardly toward the base thereof whereby said lower section is adapted to fit around and to extend downwardly between the thighs of a seated wearer and to have the base of said shield rest on the surface on which said wearer is seated,
   (3) an upper section comprising an upward extension of said midsection, said upper section being curved along its transverse axis and having a forward inclination with respect to the longitudinal axis of said midsection, said upper section being adapted to substantially cover the chest of a wearer and to permit unrestricted movements of the head and neck of a wearer,
   (4) a flange contiguous with and extending outwardly from the upper edge of said upper section and adapted to deflect ricochetting and spattering fragments away from the head and neck of a wearer and,
   (5) fastening means attached to said shield adapted to releasably secure said shield to the frame of said seat and to hold the shield in position in front of a wearer.

5. An armored shield to protect the torso of a wearer sitting in a seat from small arms fire and other high velocity projectiles, said shield comprising (1) a midsection curved along its transverse axis and adapted to cover and surround the abdomen and sides of a wearer thereof, (2) a lower section comprising a downward extension of said midsection, said lower section having a forward inclination with respect to the longitudinal axis of said midsection and having sides curved inwardly toward the base thereof whereby said lower section is adapted to fit around and to extend downwardly between the thighs of a wearer and to have the base of said shield rest on said seat, (3) an upper section comprising an upward extension of said midsection, said upper section being curved along its transverse axis and adapted to substantially cover the chest of a wearer, said upper section having a forward inclination with respect to the longitudinal axis of said midsection adapted to space said upper section from the chest of the wearer whereby protection from upward angled shots is provided to the head and neck of a wearer without restricting movements thereof, (4) a flange contiguous with and extending outwardly from the upper edge of said upper section and adapted to deflect ricochetting and spattering fragments away from the head and neck of a wearer and, (5) fastening means attached to said shield adapted to releasably secure said shield to the frame of said seat and to hold the shield in position in front of a wearer.

6. The shield of claim 5 wherein said upper section is inclined outwardly at an angle of from 5° to about 45° with respect to the longitudinal axis of the midsection and wherein said flange projects forwardly at an angle of about 15° to about 60° with respect to the longitudinal axis of the upper section.

7. The shield of claim 5 having energy-absorbing means located on the side of the shield which is adapted to be positioned adjacent to the torso of the wearer.

References Cited by the Examiner
UNITED STATES PATENTS 1,350,062   8/1920   Brewster _____ 2—25
1,466,699   9/1923   Martinson _____ 2—2.5

JORDAN FRANKLIN, *Primary Examiner.*

R. J. SCANLAN, *Examiner.*